H. E. ASBURY & E. E. PUNZELT.
COFFEE MILL.
APPLICATION FILED FEB. 10, 1915.
1,189,035.
Patented June 27, 1916.
2 SHEETS—SHEET 1.
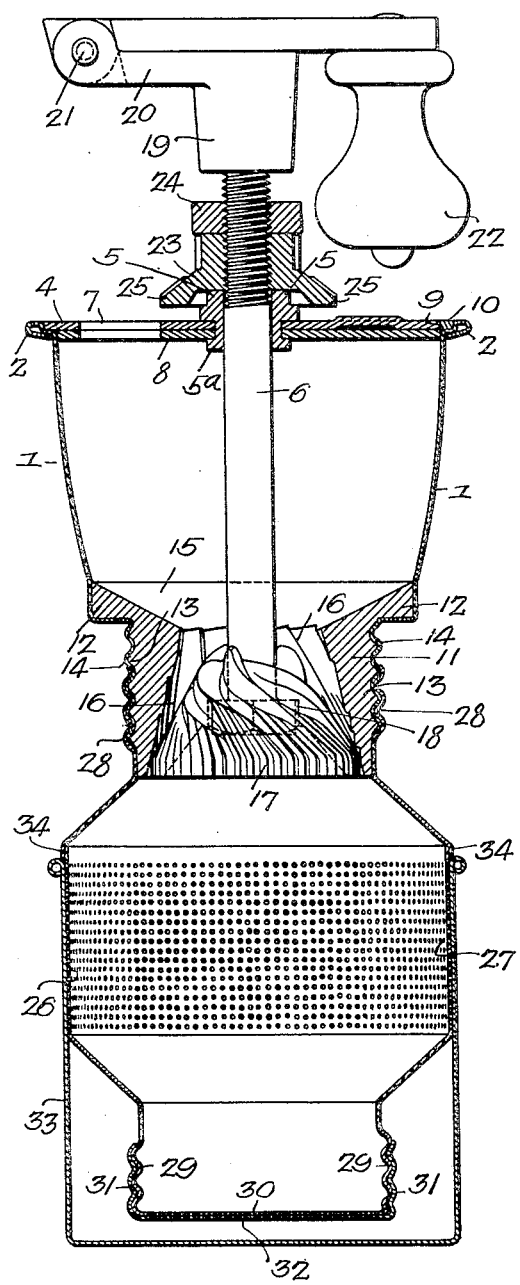
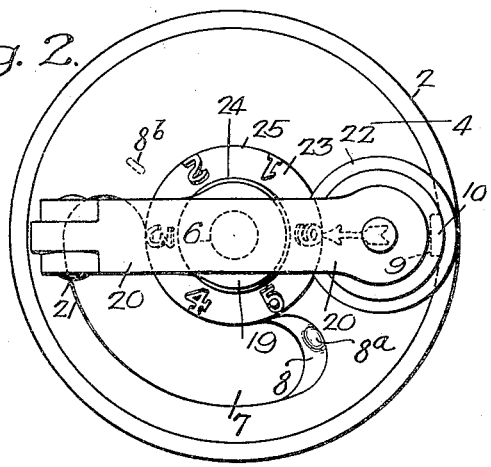
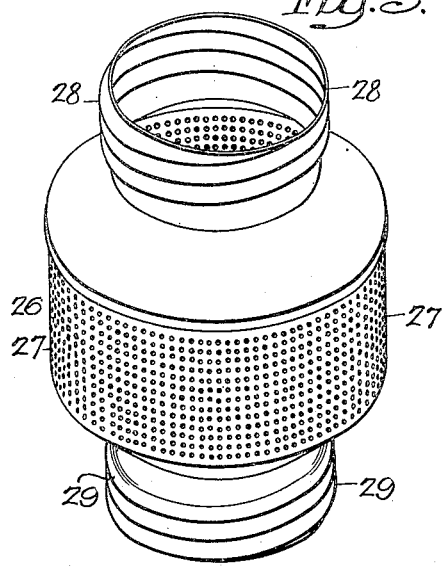
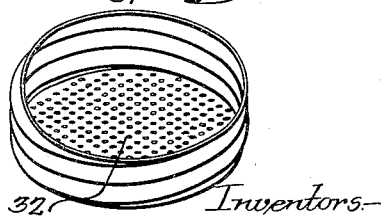
Witnesses—
Inventors—
Harry E. Asbury, Edward E. Punzelt.
by their Attorneys—

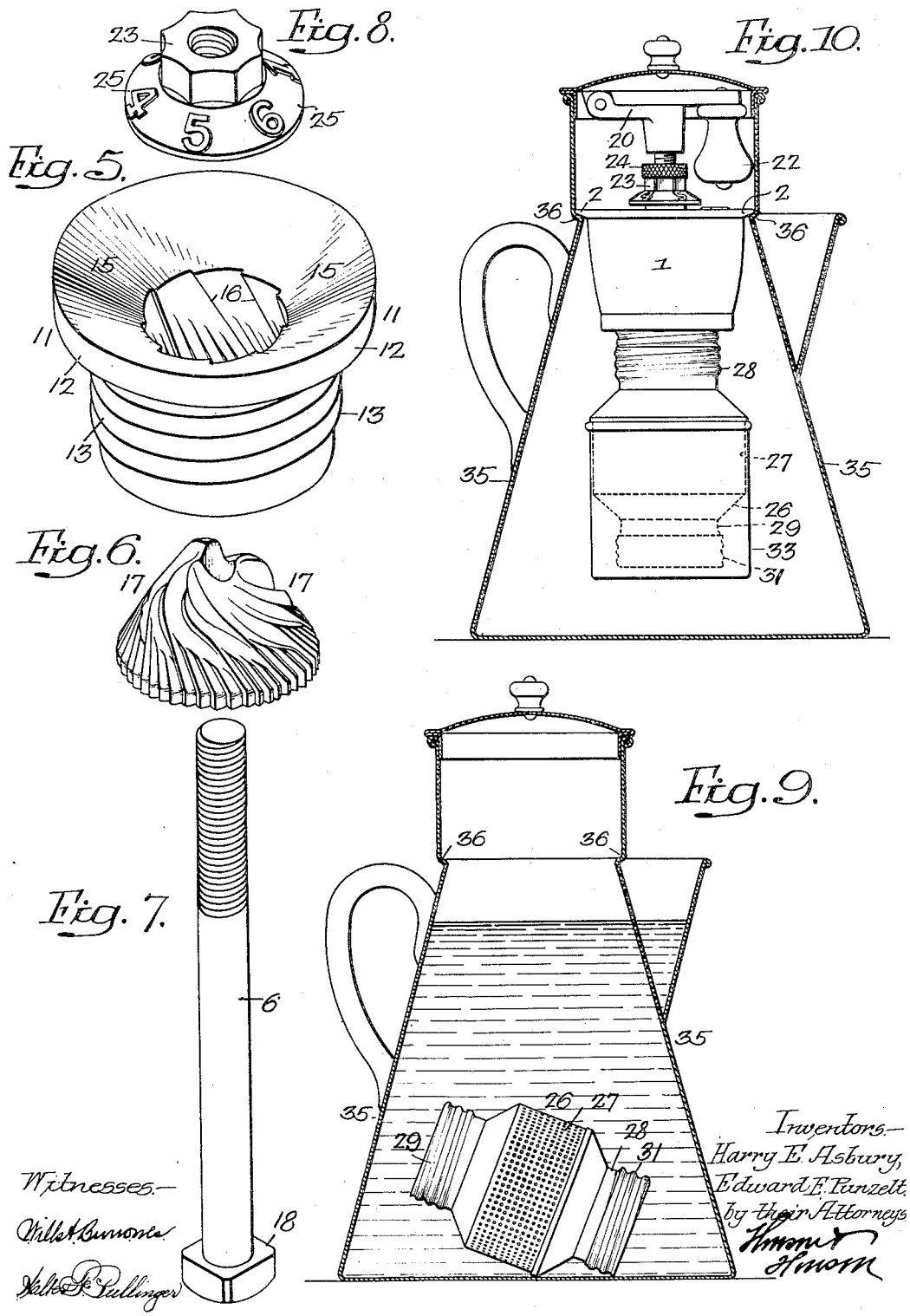

UNITED STATES PATENT OFFICE.

HARRY E. ASBURY AND EDWARD E. PUNZELT, OF PHILADELPHIA, PENNSYLVANIA, ASSIGNORS TO THE ENTERPRISE MANUFACTURING COMPANY OF PENNSYLVANIA, OF PHILADELPHIA, PENNSYLVANIA, A CORPORATION OF PENNSYLVANIA.

COFFEE-MILL.

1,189,035.  Specification of Letters Patent.  Patented June 27, 1916.

Application filed February 10, 1915. Serial No. 7,277.

*To all whom it may concern:*

Be it known that we, HARRY E. ASBURY and EDWARD E. PUNZELT, citizens of the United States, and residents of Philadelphia, county of Philadelphia, State of Pennsylvania, have invented certain Improvements in Coffee-Mills, of which the following is a specification.

One object of our invention is to construct a coffee mill in a compact form and to combine with it a receptacle for the ground coffee which can can be detached from the mill portion, and which can be used in the coffee pot as a percolator, if desired.

A further object of the invention is to construct the mill so that the grinding elements can be properly adjusted.

A still further object of the invention is to design the mill so that it can be packed in a coffee pot.

Our improved coffee pot is especially adapted for use in connection with camping outfits.

The device is intended to be held on the lap of the user with one hand, which leaves the other hand free to turn it and when the coffee has been ground and passed into the percolator section, this section is removed and the cap is applied thereto, so that it can be used in a suitable coffee pot or other receptacle.

In the accompanying drawings:—Figure 1, is a vertical sectional view through our improved coffee grinding mill; Fig. 2, is a plan view; Fig. 3, is a detached perspective view of the percolator; Fig. 4, is a perspective view of the cap of the percolator; Fig. 5, is a perspective view of the fixed grinding element carried by the hopper; Fig. 6, is a detached perspective view of the grinding cone, which is mounted in the grinding element, Fig. 5; Fig. 7, is a detached perspective view of the shaft; Fig. 8, is a detached perspective view of the regulator for regulating the distance between the grinding elements; Fig. 9, is a sectional view of a coffee pot, showing the detached percolator therein; and Fig. 10, is a view of a coffee pot, showing the grinder and the percolator packed within a coffee pot.

Referring in the first instance to Fig. 1, 1 is a hopper having a flange, preferably recessed to receive a cover plate 4 which carries the bearing 5 for the shaft 6. 11 is a fixed grinding element carried by the hopper 1 and this element has a flange 12 and an externally threaded portion 13, and the hopper is shaped to fit the flange and has a threaded portion 14 which engages the threaded portion 13 of the grinding element. The upper portion of the grinding element is beveled, as at 15, and the lower portion is shaped as shown and has grinding ribs 16 formed on its wall; these ribs may be in any form desired. 17 is a grinding cone also having teeth or ribs which feed the coffee and grind it in connection with the ribs 16 on the fixed element 11. The ribs or blades of this cone may be shaped in any manner desired.

It will be noticed that the cone is less in diameter at the upper end than the grinding element so that the coffee beans will pass into the space between the two elements. The shaft 6 has a square, or otherwise shaped, head 18 which is adapted to a similar opening in the grinding cone so that the grinding cone will turn with the shaft. The opposite end of the shaft is screw threaded and adapted to the threads is the hub 19 of the handle 20. This handle is made in two parts hinged at 21 so that one can be folded onto the other, the knob or handle 22 assuming the position illustrated in Fig. 1, so that the device will occupy but a minimum amount of space.

In the present instance the cover plate 4 is made of sheet metal and is recessed to receive a lug 10 on the hopper to prevent it turning and has an opening 7 through which the coffee to be ground is inserted in the hopper. Under the plate 4 is a valve plate 8 having an opening similar to the opening 7 in the plate 4. The bearing 5 has a flange 5ª which is turned over the valve plate and holds the two plates 4 and 8 in proper position. A struck up projection 8ª on the plate 8 acts as a stop and also as a means for turning the valve plate to close the opening 7. A second projection 8ᵇ of the valve plate is arranged to enter a notch in the plate 4, in the present instance formed by pressing up the arrow on the said plate. This projection retains the valve plate in its closed position.

Mounted between the hub 19 and the bearing 5 of the cap plate 4 is a regulator 23 and a jam nut 24 locks the regulator in the position to which it is adjusted. The regulator has a bevel flange 25, in the present instance, on which are numbers, or other indicating marks, and the hub portion has a series of ribs by which it can be grasped so that it can be turned in either direction to raise or lower the grinding cone, thus enabling the coffee beans to be ground to any degree of fineness desired. An arrow on the cap plate, shown by dotted lines, Fig. 2, acts as an indicating mark in connection with the numbers on the regulator.

26 is a receptacle which, in the present instance, is also a percolator, shaped as shown in Fig. 3, and it has a perforated body portion 27 and a screw threaded extension 28 at one end and a screw threaded extension 29 at the opposite end. The extension 29 has a perforated bottom 30 and the screw threaded extension 28 is adapted to mesh with the threads 14 of the hopper section, as shown in Fig. 1.

31 is a cap having a perforated plate 32, as shown in Fig. 4, and this cap, when the percolator is attached to the grinding element, is secured, for convenience, on the threaded portion 29 of the percolator, and, after the coffee has been ground, the cap is unscrewed from the portion 29 and is screwed onto the portion 28, thus closing the percolator which can then be placed in any suitable coffee pot, or other receptacle, as illustrated in Fig. 9.

In some instances, we may mount the percolator in a cupshaped receptacle 33, which snugly fits the body portion 27 of the percolator and rests against the upper flange 34 thereof. This may be secured simply by a tight fit or may be provided with means for positively engaging the percolator. The cup, when detached, may be used as a drinking cup.

We preferably make the combined coffee mill and percolator of such a size that it can be placed in a coffee pot 35, as illustrated in Fig. 10, the upper flange 2 of the coffee mill resting on the flange 36 of the body of the coffee pot 35, as shown in Fig. 10; the flange being a sufficient distance below the top of the coffee pot to allow the lid to be placed thereon so that the mill and percolator are entirely inclosed within the coffee pot. Other arrangements may be resorted to without departing from the essential features of the invention.

The percolator is attached as shown in Fig. 1 and the coffee beans are placed in the hopper of the mill and the valve plate 8 is shifted to close the opening 7. The handle is extended and the mill is held on the lap by one hand while the handle is turned by the other hand of the user. The ground coffee will pass between the two grinding elements and into the body of the percolator 26 and, after a sufficient quantity of coffee has been ground, the percolator is detached from the mill and the cap 31 is removed from the bottom thereof and is placed on the opposite end so as to close both ends of the percolator. The percolator is then ready to be placed in the coffee pot, such, for instance, as is shown in Fig. 9, and the coffee is made in the ordinary manner.

When the coffee mill is not in use and there is ground coffee in the percolator, we preferably inclose the percolator within the cup 33, shown in Fig. 1, and this cup may be dispensed with when the percolator is in use in combination with the coffee pot and mill, as shown in Fig. 10.

While we have shown the means of attaching the percolator to the hopper of the mill in the form of a screw thread, it will be understood that an equivalent means of fastening may be used, such as a bayonet joint, a broken thread, or, in fact, in some instances, only a tight fit may be necessary to retain the percolator in position on the mill while the coffee is being ground.

We preferably make the mill cylindrical in form, as shown, both the hopper and the percolator being in the form of a cylinder, and that portion of the mill between the hopper and the percolator is reduced in diameter so as to form an annular recess. This makes it possible to place the mill diagonally on the lap, the reduced portion being such that it will fit the leg, enabling the user to hold the mill rigidly on the lap while the coffee is being ground.

We claim:—

1. The combination in a coffee mill, of a hopper; grinding elements; means for turning the grinding elements; a detachable receptacle attached to the lower portion of the mill; and a cap adapted to be secured to the open end of the receptacle when it is removed from the mill.

2. The combination in a coffee mill, of a hopper having a threaded portion; two grinding elements, one grinding element being stationary and having a threaded portion adapted to the threaded portion of the hopper, the other grinding element being mounted in the first mentioned element; and means for turning said last mentioned element.

3. The combination in a coffee mill, of a hopper having a screw threaded portion at its lower end; a grinding element having a threaded portion adapted to the threaded portion of the hopper; a rotating grinding element co-acting with the first element; and a receptacle for the ground coffee having a threaded portion also adapted to the threaded portion of the hopper.

4. The combination in a coffee mill, of a hopper having a reduced threaded portion forming a shoulder; a grinding element having a flange resting on the shoulder and secured to the hopper; and a detachable receptacle having a threaded portion adapted to the threaded portion of the hopper.

5. The combination in a grinding mill, of a hopper having a reduced threaded portion at its lower end; a fixed grinding element mounted in the lower end of the hopper; a rotating grinding element; means for rotating said element; a receptacle having a perforated body portion and threaded at one end, the threaded portion of the receptacle being adapted to the threaded portion of the hopper.

6. The combination in a coffee mill, of a hopper having a reduced threaded portion at one end; a fixed grinding element mounted in the hopper; a rotating grinding element; means for turning the said element; a receptacle having an enlarged body portion with peripheral perforations and having a reduced screw threaded extension at each end, the lower extension having a perforated bottom; and a screw threaded cap having a perforated end adapted to fit either end of the receptacle.

7. The combination in a coffee mill, of a hopper having an extension; a fixed grinding element in the extension; a rotating grinding element; means for rotating said element; a receptacle mounted under the hopper and having an extension fitting the extension of the hopper and detachable therefrom; and a cap carried by one end of the receptacle and adapted to be secured on the opposite end thereof.

In testimony whereof, we have signed our names to this specification, in the presence of two subscribing witnesses.

HARRY E. ASBURY.
EDWARD E. PUNZELT.

Witnesses:
CLYDE T. MOYER,
WM. A. BARR.